(12) United States Patent
Ruglio et al.

(10) Patent No.: US 11,346,371 B2
(45) Date of Patent: May 31, 2022

(54) METHOD TO STRIP COATINGS OFF OF AN ALUMINUM ALLOY FAN BLADE

(71) Applicant: United Technologies Corporation, Farmington, CT (US)

(72) Inventors: Anthony G. Ruglio, Rocky Hill, CT (US); George H. Reynolds, Sanford, ME (US); Gerard V. Cadieux, Manchester, CT (US); George Kenneth Spencer, Guntersville, AL (US)

(73) Assignee: Raytheon Technologies Corporation, Farmington, CT (US)

( * ) Notice: Subject to any disclaimer, the term of this patent is extended or adjusted under 35 U.S.C. 154(b) by 114 days.

(21) Appl. No.: 15/971,722

(22) Filed: May 4, 2018

(65) Prior Publication Data
US 2019/0338789 A1    Nov. 7, 2019

(51) Int. Cl.
| | |
|---|---|
| *B08B 3/02* | (2006.01) |
| *B08B 3/08* | (2006.01) |
| *B08B 7/00* | (2006.01) |
| *F04D 29/70* | (2006.01) |
| *F04D 29/02* | (2006.01) |

(52) U.S. Cl.
CPC ............ *F04D 29/703* (2013.01); *B08B 3/022* (2013.01); *B08B 3/024* (2013.01); *B08B 3/08* (2013.01); *B08B 7/0092* (2013.01); *F04D 29/023* (2013.01); *B08B 2203/0223* (2013.01); *B08B 2220/01* (2013.01)

(58) Field of Classification Search
None
See application file for complete search history.

(56) References Cited

U.S. PATENT DOCUMENTS

| | | | |
|---|---|---|---|
| 4,696,421 A | 9/1987 | Durr | |
| 5,733,174 A | 3/1998 | Bingham et al. | |
| 5,783,022 A | 7/1998 | Cha et al. | |
| 5,942,045 A * | 8/1999 | Raghavan | B05B 1/04 |
| | | | 134/34 |
| 6,364,971 B1 | 4/2002 | Peterson, Jr. et al. | |
| 6,746,559 B2 | 6/2004 | Ohmi et al. | |
| 8,800,145 B2 | 8/2014 | Mukheiji et al. | |
| 2002/0124868 A1* | 9/2002 | Rice | B60S 3/006 |
| | | | 134/10 |
| 2003/0140950 A1 | 7/2003 | Kim et al. | |

(Continued)

FOREIGN PATENT DOCUMENTS

| | | | | |
|---|---|---|---|---|
| EP | 3184735 A2 * | 6/2017 | ......... | C23C 18/1254 |
| EP | 3434865 A1 | 1/2019 | | |

(Continued)

OTHER PUBLICATIONS

Pratt & Whitney Launches PurePulse Waterjet Technology, May 22, 2012. <https://www.youtube.com/watch?v=-p1LJo-IDcE>.*

(Continued)

*Primary Examiner* — Nicole Blan
(74) *Attorney, Agent, or Firm* — Kinney & Lange, P.A.

(57) ABSTRACT

A method for stripping a coating off of a blade includes discharging liquid nitrogen through a nozzle onto the blade at a coating to cause lifting of the coating from a substrate of the blade and traversing the nozzle along the blade to cause peeling of the coating off of the substrate of the blade as the nozzle traverses the blade.

16 Claims, 6 Drawing Sheets

(56) References Cited

U.S. PATENT DOCUMENTS

| | | |
|---|---|---|
| 2007/0023142 A1 | 2/2007 | LaGraff et al. |
| 2009/0050718 A1 | 2/2009 | Henry et al. |
| 2009/0217793 A1 | 9/2009 | Spillner et al. |
| 2009/0261068 A1 | 10/2009 | Kool et al. |
| 2009/0290348 A1 | 11/2009 | Van Laanen et al. |
| 2010/0154992 A1 | 6/2010 | Feinstein et al. |
| 2010/0162565 A1 | 7/2010 | Mukherji et al. |
| 2011/0150636 A1* | 6/2011 | Tholen .................... B23P 6/007 415/173.1 |
| 2011/0211965 A1 | 9/2011 | Deal et al. |
| 2012/0171934 A1 | 7/2012 | Quintard et al. |
| 2013/0048224 A1 | 2/2013 | George et al. |
| 2014/0113527 A1 | 4/2014 | Lindsay et al. |
| 2014/0251381 A1* | 9/2014 | Markowski, III ...... F01D 5/005 134/21 |
| 2015/0041330 A1 | 2/2015 | Loftus, Jr. et al. |
| 2016/0199885 A1* | 7/2016 | Mitchell ............... F01D 11/127 134/37 |
| 2017/0023008 A1* | 1/2017 | Roche ..................... F01D 5/282 |
| 2017/0252896 A1 | 9/2017 | Gascher et al. |
| 2017/0370223 A1 | 12/2017 | Holland |
| 2019/0022698 A1* | 1/2019 | Harner ................... B05D 7/586 |
| 2019/0061073 A1 | 2/2019 | Bogue et al. |

FOREIGN PATENT DOCUMENTS

| | | | |
|---|---|---|---|
| WO | WO2011036373 A2 | 3/2011 | |
| WO | 2014141311 A1 | 9/2014 | |
| WO | WO2014141311 A1 | 9/2014 | |
| WO | WO2016041957 A1 | 3/2016 | |

OTHER PUBLICATIONS

Extended European Search Report for European Patent Application No. 19171907.9, dated Sep. 2, 2019, 6 pages.

Khaled Giasin: "Machining Fibre Metal Laminates and A12024-T3 aluminium alloy", Jan. 19, 2017, XP055531528, retrieved from the Internet: URL:http://etheses.whiterose.ac.uk/16061/1/Phd%20thesis.pdf—This reference is being transmitted in six segments.

Sun-Min Kim et al.: A Comparison of Adhesive Tape-Separation Methods from Surfaces; Dipping in Liquid Nitrogen, Liquid Nitrogen Spray and an Adhesive Neutralizer Method:, Journal of Forensic Research, vol. 7, No. 05, Jan. 1, 2016.

Takayuki Shimoda et al.: "Study of Cryogenic Mechanical Strength and Fracture Behavior of Adhesives for CFRP Tanks of Reusable Launch Vehicles", Mar. 1, 2006, pp. 55-70, Retrieved from the Internet: URL:https://www.researchgate.net/publication/31900776_Study_of_Cryogenic_Mechanical_Strength_and_Fracture_Behavior_of_Adhesives_for_CFRP_Tanks_of_Reusable_Launch_Vehnicles.

Extended European Search Report for European Patent Application No. 18189058.3, dated Dec. 17, 2018, 8 pages.

NITROJET, [Online], Retrieved on Apr. 19, 2018, Cleaning-IHI Southwest Technologies, Inc., http://www.ihiswt.com/nitrojet/cleaning/. p. 1.

Communication Pursuant to Article 94(3) EPC for European Patent Application No. 18189058.3, dated Mar. 11, 2020, 5 pages.

* cited by examiner

METHOD TO STRIP COATINGS OFF OF AN ALUMINUM ALLOY FAN BLADE

BACKGROUND

The present disclosures relates to coatings, and in particular, to removal of coatings from blades.

Aircraft require coated fan blades. Coatings on fan blades may become damaged during flight and require removal from the fan blade. Coatings may also require removal and repair during processing of the fan blades. Coatings are often removed from fan blades via plastic media blasting, which is a manual process. Manually removing coatings is time consuming and introduces human error. Plastic media blasting can also erode and damage the substrate of the fan blade.

SUMMARY

A method for stripping a coating off of a blade includes discharging liquid nitrogen through a nozzle onto the blade at a coating to cause lifting of the coating from a substrate of the blade and traversing the nozzle along the blade to cause peeling of the coating off of the substrate of the blade as the nozzle traverses the blade.

DETAILED DESCRIPTION

In general, the present disclosure describes a method for completely stripping an airfoil coating and a tip coating off of a fan blade to expose an aluminum substrate of the fan blade that uses liquid nitrogen blasting. The result is a method that is quicker, automated, and results in zero stock loss of the substrate, without causing damage to the substrate.

Figure 1:
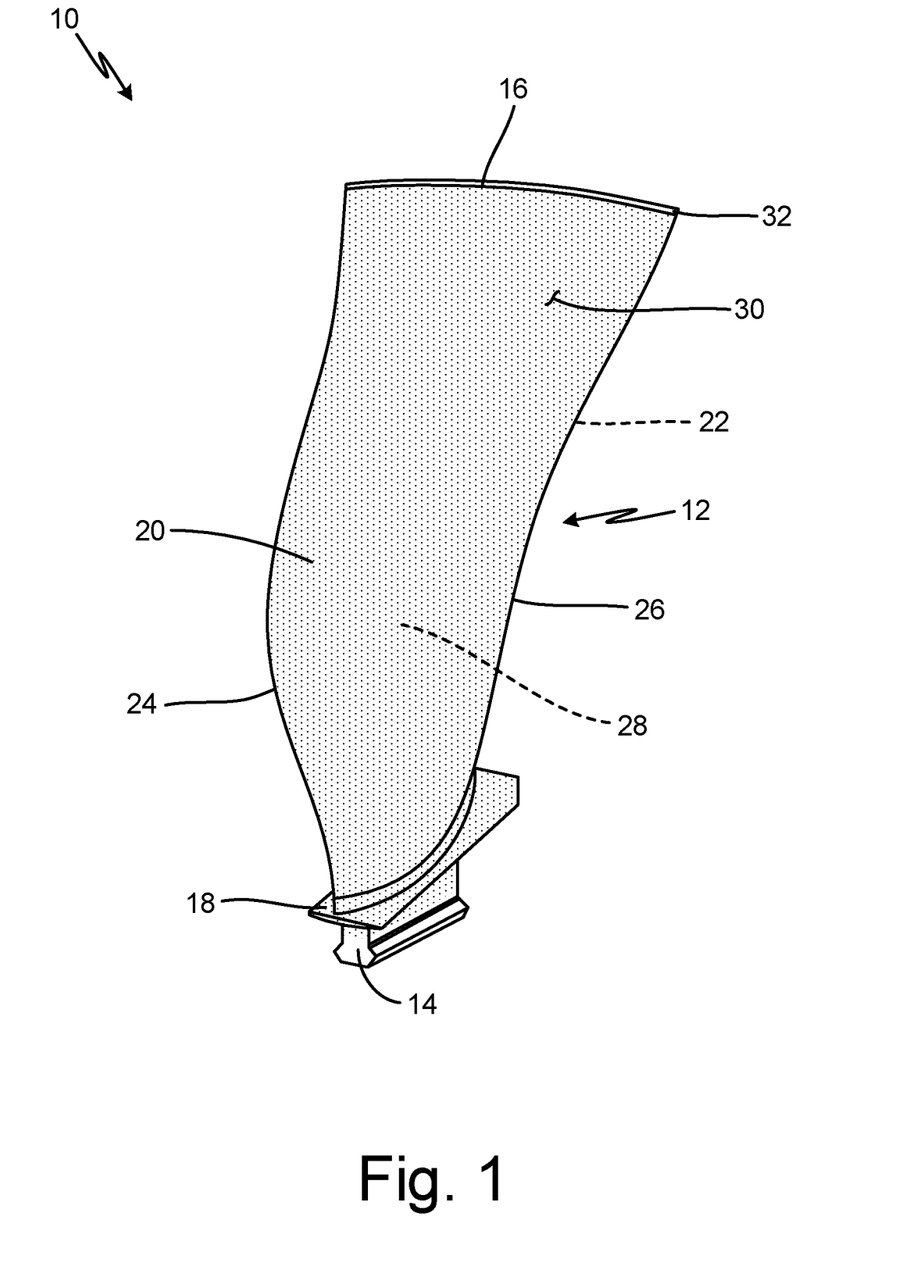
FIG. 1 is a perspective view of a fan blade showing an airfoil coating and a tip coating.
Figure 2A:
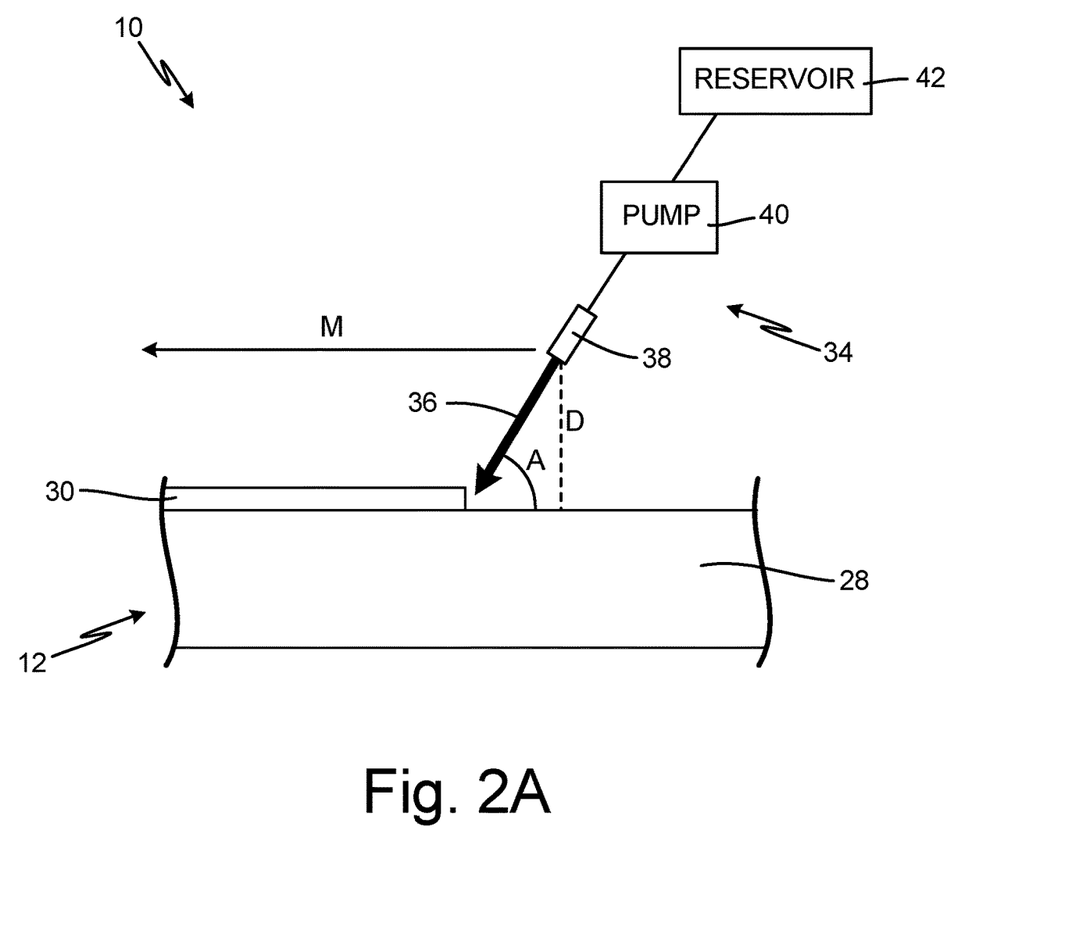
FIG. 2A is a schematic view of a stream of liquid nitrogen directed at the airfoil coating.
Figure 2B:
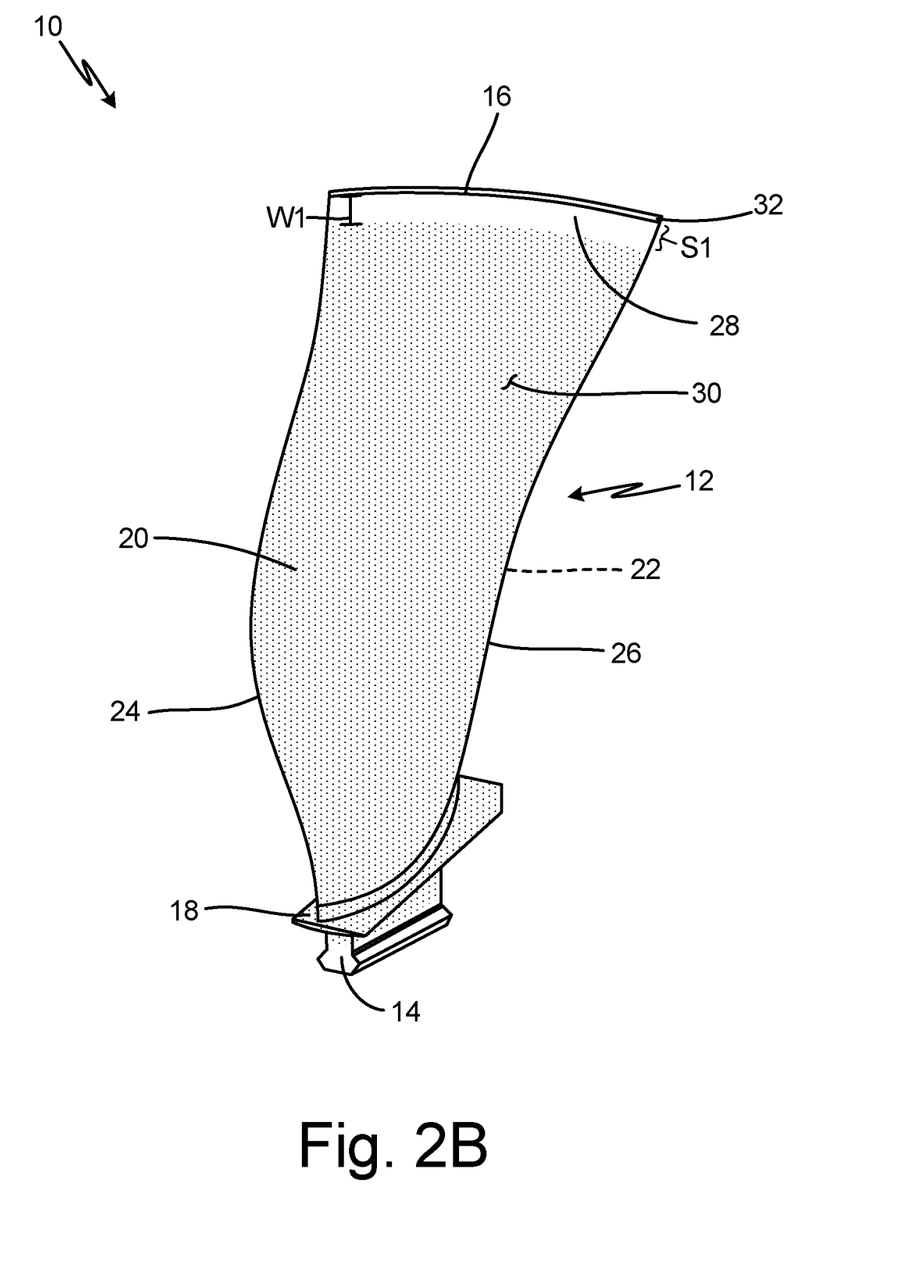
FIG. 2B is a perspective view of the fan blade showing a strip of the fan blade with the airfoil coating removed.
Figure 2C:
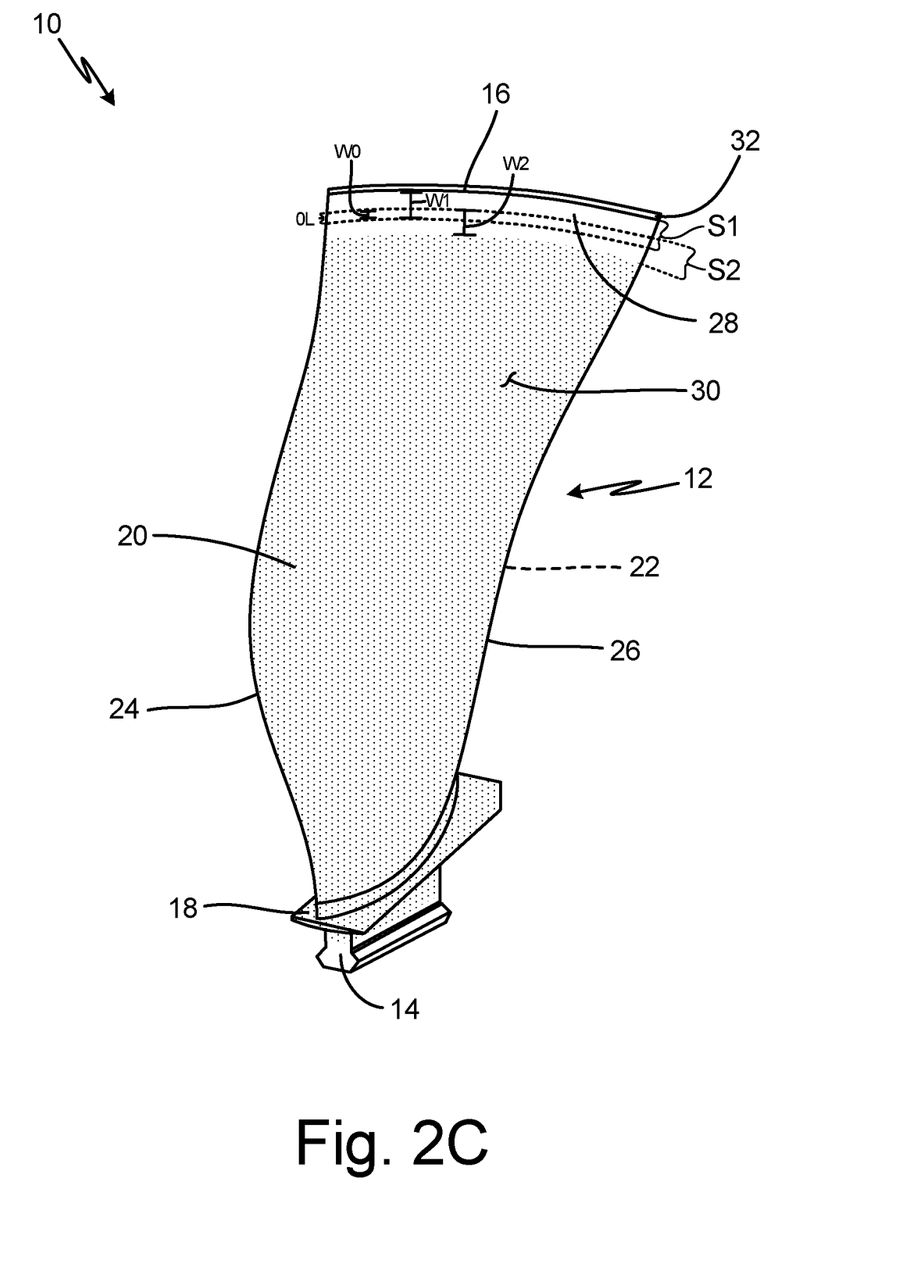
FIG. 2C is a perspective view of the fan blade showing an overlap between two strips of the fan blade.
Figure 3A:
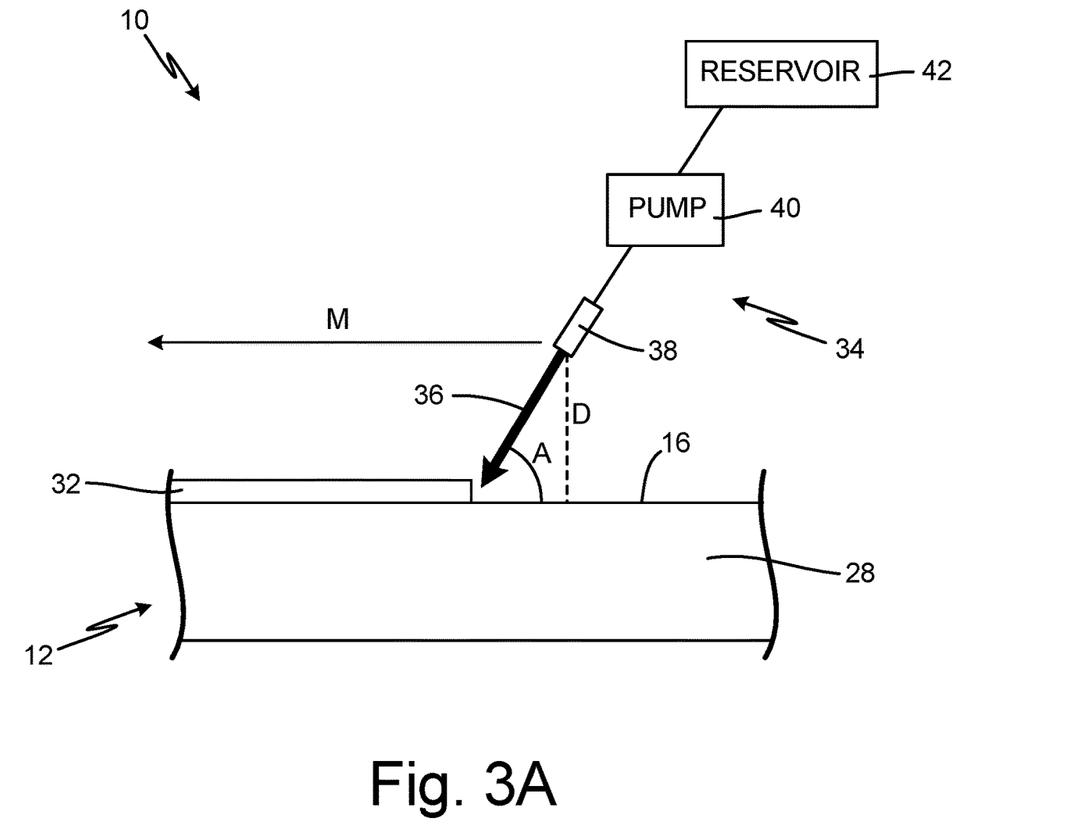
FIG. 3A is a schematic view of a stream of liquid nitrogen directed at the tip coating.
Figure 3B:
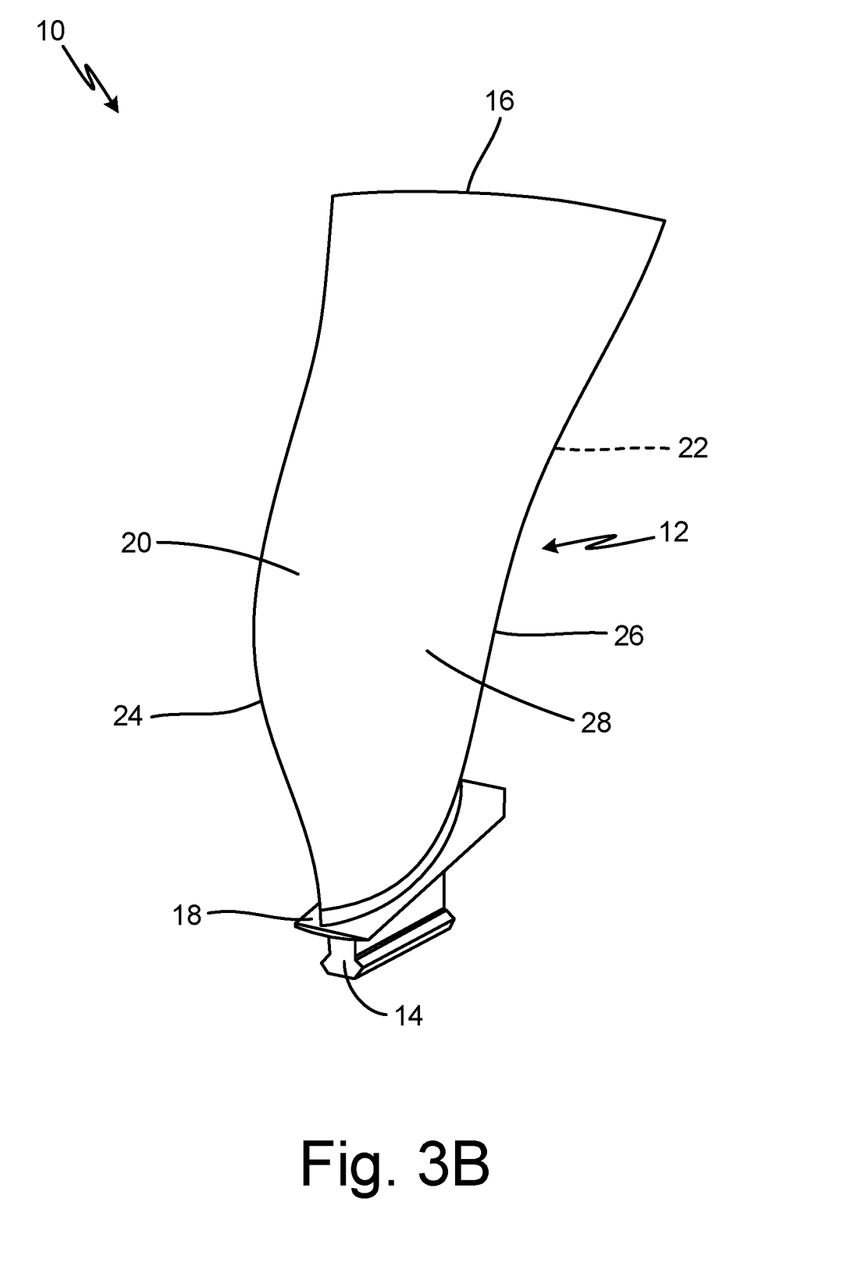
FIG. 3B is a perspective view of the fan blade showing the airfoil coating and the tip coating removed.

FIG. 1 is a perspective view of fan blade 10 showing airfoil coating 30 and tip coating 32. FIG. 2A is a schematic view of a stream of liquid nitrogen 36 directed at airfoil coating 30. FIG. 2B is a perspective view of fan blade 10 showing strip S of fan blade 10 with airfoil coating 30 removed. FIG. 2C is a perspective view of fan blade 10 showing overlap O between two strips S of fan blade 10. FIG. 3A is a schematic view of a stream of liquid nitrogen 36 directed at tip coating 32. FIG. 3B is a perspective view of fan blade 10 showing airfoil coating 30 and tip coating 32 removed. FIGS. 1-3B will be discussed together.

Fan blade 10 includes airfoil body 12, root 14, tip 16, platform 18, first side 20, second side 22, leading edge 24, trailing edge 26, substrate 28, airfoil coating 30, and tip coating 32. Liquid nitrogen blast system 34 includes liquid nitrogen 36, nozzle 38, pump 40, and reservoir 42.

Fan blade 10 has airfoil body 12 forming the main body of fan blade 10. Root 14 is at a first end of airfoil body 12, and tip 16 is at a second end of airfoil body 12. Airfoil body 12 has a twisted airfoil shape. Platform 18 is between airfoil body 12 and root 14. First side 20 is at a first side of airfoil body 12 and extends from root 14 to tip 16, and second side 22 is at a second side of airfoil body 12 and extends from root 14 to tip 16. Leading edge 24 is at a first edge of airfoil body 12 formed by first side 20 and second side 22, leading edge 24 extending from root 14 to tip 16. Trailing edge 26 is at a second edge of airfoil body 12 formed by first side 20 and second side 22, trailing edge 26 extending from root to tip 16. Fan blade 10 may include a cover attached (e.g. with epoxy) to first side 20 of airfoil body 12 and/or a sheath attached (e.g. with epoxy) to leading edge 24.

Fan blade 10 is made of aluminum alloy substrate 28, which is covered by airfoil coating 30 and tip coating 32. As seen in FIG. 1, airfoil coating 30 covers first side 20 and second side 22 of airfoil body 12, platform 18, and a portion of root 14 adjacent airfoil body 12. Tip coating 32 covers tip 16 of airfoil body 12. In this embodiment, airfoil coating 30 is comprised of three layers. A first chemical layer, or bond primer, is applied to substrate 28, which is already covered in an anodized bond coating, a second paint primer layer is applied to the first layer, and a third urethane top layer is applied to the second layer. The third layer is an erosion coating. In this embodiment, tip coating 32 is a thermal plasma spray coating. In alternate embodiments, airfoil coating 30 and tip coating 32 may be thermal spray, polyurethane, primers, epoxies, or any other suitable specialty coatings.

Liquid nitrogen blast system 34 dispenses liquid nitrogen 36 from nozzle 38. Nozzle 38 may a non-rotating or rotating nozzle such that rotation of nozzle 38 is at least between 0 and about 1,000 RPM. Nozzle 38 may be a single-orifice nozzle or a multi-orifice nozzle. One or more orifices of nozzle 38 may be jeweled. Nozzle 38 is fluidly connected to pump 40 via tubing (not shown) such that liquid nitrogen 36 moves through tubing from reservoir 42 to pump 40 to nozzle 38. Pump 40 is a cryogenic pump for pressurizing liquid nitrogen 36. Pump 40 has a pressure between about 10,000 psi and about 60,000 psi. The flow rate from nozzle 38 is determined by the pressure of pump 40 and the shape of and number of orifices in nozzle 38. Pump 40 is fluidly connected to reservoir 42, which holds liquid nitrogen 36. Liquid nitrogen blast system 34 may also include a robot and controller to manipulate the nozzle, a mount for fixing fan blade 10, a turntable for manipulation of fan blade 10, a sound enclosure, an exhaust system, and axillary equipment.

Liquid nitrogen 36 is sprayed to remove airfoil coating 30 and tip coating 32 from fan blade 10. As seen in FIG. 2A, fan blade 10 is liquid nitrogen blasted, or liquid nitrogen 36 is discharged through nozzle 38 as a stream onto fan blade 10 at airfoil coating 30 to impact airfoil coating 30 (which is the material to be stripped from fan blade 10). Nozzle 38 is positioned to have a standoff distance D from fan blade 10, or the distance between nozzle 38 and fan blade 10, of at least between about 0.050 inch (0.127 centimeter) and 2.0 inches (5.08 centimeters). Nozzle 38 also has an angle of attack A, or angle with respect to fan blade 10, of at least between about 45 degrees and about 90 degrees. Airfoil coating 30 is lifted from substrate 28 of fan blade 10 by the pressurized stream of liquid nitrogen 36 hitting fan blade 10. Liquid nitrogen 36 goes underneath airfoil coating 30 to peel airfoil coating 30 away. More specifically, the first layer erodes off substrate 28 during the blast process and the second layer erodes or fractures at the same time as the first layer. The third layer exfoliates and is plowed away by the blast stream of liquid nitrogen 36. As a result, all three layers of airfoil coating 30 are removed at the same time. Nozzle 38 discharging liquid nitrogen 36 is traversed along fan blade 10 in direction of movement M to peel airfoil coating 30 off of substrate 28 as nozzle 38 traverses fan blade 10. Nozzle 38 traverses fan blade 10 at a speed of at least between about 1 mm/s and 50 mm/s. Nozzle 38 is moved along fan blade 10 to lift and peel airfoil coating 30 off of substrate 28 to reveal strips S (including S1 and S2) of substrate 28. A single pass of nozzle 38 reveals a strip S of substrate 28. Strips S may have a width W up to about 2 inches (5.08 centimeters). Nozzle 38 is moved along fan blade 10 such that strips S overlap to form overlap OL having a width WO.

Nozzle 38 may be configured (e.g. single-orifice or multi-orifice, jeweled orifice, and rotating or non-rotating) based upon the desired width W of strip S or based upon the location of fan blade 10 that requires coating removal. If nozzle 38, for example, is a single-orifice nozzle with a fan-like spray pattern, nozzle 38 may not rotate. On the other hand, if nozzle 38, for example, is a multi-orifice nozzle, nozzle 38 is rotating.

Nozzle 38 may traverse along fan blade 10 such that nozzle 38 traverses fan blade 10 in a first lateral direction with respect to fan blade 10 (from leading edge 24 to trailing edge 26 or from trailing edge 26 to leading edge 24). Subsequently, nozzle 38 is moved longitudinally with respect to fan blade 10 along fan blade 10 (up or down either tailing edge 26 or leading edge 24 depending on where nozzle 38 stopped after the previous pass along fan blade 10) to form a desired overlap OL. Nozzle 38 then traverses fan blade 10 in a second lateral direction with respect to fan blade 10 (from trailing edge 26 to leading edge 24 or from leading edge 34 to trailing edge 26) that is opposite the first lateral direction. Such a process continues until all of airfoil coating 30 is stripped from fan blade 10.

Alternatively, nozzle 38 may traverse along fan blade 10 such that nozzle traverses fan blade 10 in a first longitudinal direction with respect to fan blade 10 (from tip 16 to platform 18, platform 18 to root 14, root 14 to platform 18, or from platform 18 to tip 16). Subsequently, nozzle 38 is moved laterally with respect to fan blade 10 along fan blade 10 (across either platform 18, root 14, or tip 16 depending on where nozzle 38 stopped after the previous pass along fan blade 10) to form a desired overlap OL. Nozzle 38 then traverses fan blade 10 in a second longitudinal direction with respect to fan blade 10 (from platform 18 to tip 16, from root 14 to platform 18, from platform 18 to root 14, or from tip 16 to platform 18) that is opposite the first longitudinal direction. Such a process continues until all of airfoil coating 30 is stripped from airfoil body 12, platform 18, and root 14 of fan blade 10. As such, nozzle 38 traverses fan blade 10 in a rastering pattern. Nozzle 38 also traverses fan blade 10 in an automated, programed, robot-controlled process. As such, parameters such as angle of attack A, stand-off distance D, pressure of pump 40, and the pattern of traversing fan blade 10 can be dictated, and repeated. Fan blade 10 can be oriented in any direction with respect to liquid nitrogen blast system 34.

As seen in FIG. 2B, a first pass of nozzle 38 discharging liquid nitrogen 36 along first side 20 of fan blade 10 in a first lateral direction reveals a first strip S1 of substrate 28. In this embodiment, first strip S1 extends between leading edge 24 and trailing edge 26 and has a width W1 of about 2 inches (5.08 centimeters). Nozzle 38 is moved about 1 inch (2.54 centimeters) longitudinally along fan blade 10 to generate a desired overlap OL of about 1 inch. As seen in FIG. 2C, nozzle 38 discharging liquid nitrogen 36 traverses fan blade 10 in a second lateral direction opposite the first lateral direction to form a second strip S2, which also has a width W2 of about 2 inches, and an overlap OL between first strip S1 and second strip S2 having a width WO of about 1 inch. Nozzle 38 continues to traverse fan blade 10 until all of airfoil coating 30 is stripped to reveal all of substrate 28 that was previously covered by airfoil coating 30.

As seen in FIG. 3A, liquid nitrogen 36 is then discharged through nozzle 38 onto tip coating 32 on tip 16 of fan blade 10. Liquid nitrogen 36 freezes and shatters tip coating 32, or breaks up tip coating 32 into powder, to strip tip coating 32 from tip 16 of fan blade 10. Nozzle 38 discharging liquid nitrogen 36 is traversed along tip 16 of fan blade 10 in direction of movement M to remove all of tip coating 32 from tip 16 as nozzle 38 traverses tip 16 of fan blade 10. As seen in FIG. 3B, after nozzle 38 discharging liquid nitrogen 36 has traversed all of fan blade 10 having either airfoil coating 30 or tip coating 32, fan blade 10 is free of airfoil coating 30 and tip coating 32. Fan blade 10 may then be re-coated. After the liquid nitrogen blasting is complete, the liquid nitrogen evaporates such that the only clean-up required is with respect to coatings 30 and 32.

Typically, airfoil coatings are removed from fan blades using a plastic media blast process, which is a manual process that is time-consuming, often taking multiple hours to complete, and results in stock loss of the aluminum substrate. Further, the manual process introduces the possibility of human error, generally relying on visual indicators while moving along the fan blade. Additionally, during the high pressure plastic media blasting process, plastic media may become imbedded in the fan blade. Similarly, water jet processes, which can also be used to remove coatings, are time intensive, result in stock loss, and risk water getting into the fan blade. Moreover, no process is approved to remove a thermal spray tip coating.

Liquid nitrogen blasting allows airfoil coating 30 to be peeled off, or completely removed from, substrate 28, without eroding or damaging substrate 28. Likewise, liquid nitrogen blasting removes tip coating 32 without eroding or damaging substrate 28. As such, coatings 30 and 32 may be completely stripped from aluminum alloy substrate 28 of fan blade 10 with zero stock loss of substrate 28. Therefore, liquid nitrogen blasting of fan blades results in complete coating removal without any substrate erosion, or zero stock loss.

Using liquid nitrogen blasting to remove coatings from fan blades is a much faster process, potentially taking only minutes to complete. Liquid nitrogen blasting can remove a coating to reveal strips of substrate having larger widths so that a large amount of coating can be removed very quickly, greatly reducing the time required to strip the fan blade. Additionally, because liquid nitrogen blasting is an automated, robot-controlled process, human error is reduced to yield a more controllable, repeatable, less variable process.

Fan blades may have unsatisfactory, or non-conforming, coatings. For example, coatings may have adhesion problems, such as delamination, dimples, nodules, or other imperfections. Unsatisfactory coatings may result during processing of the fan blade, or coatings may become unsatisfactory during flight of the aircraft. As such, fan blade 10 can be easily and quickly stripped of coatings 30 and 32 using liquid nitrogen blasting so that fan blade 10 can be re-worked or refurbished with new coatings.

While the method for stripping a coating off of a blade has been described in reference to fan blade 10, such a method may be used for stripping a coating off of any suitable blade, including rotating and non-rotating blades. Further, while traversing the nozzle along the blade has been described as moving the nozzle with respect to the blade, traversing the nozzle along the blade can also be achieved by moving the blade with respect to the nozzle (while the nozzle is stationary).

Discussion of Possible Embodiments

The following are non-exclusive descriptions of possible embodiments of the present invention.

A method for stripping a coating off of a blade includes discharging liquid nitrogen through a nozzle onto the blade at a coating to cause lifting of the coating from a substrate of the blade; and traversing the nozzle along the blade to cause peeling of the coating off of the substrate of the blade as the nozzle traverses the blade.

The method of the preceding paragraph can optionally include, additionally and/or alternatively, any one or more of the following features, configurations and/or additional components:

The blade is a fan blade.

Peeling the coating off of the substrate of the blade includes peeling the coating off of the substrate of the blade without eroding the substrate of the blade.

Positioning the nozzle to have a stand-off distance from the blade of at least between about 0.050 inch (0.127 centimeter) and 2.0 inches (5.08 centimeters).

Traversing the nozzle along the blade includes: traversing the blade in a first lateral direction; moving the nozzle longitudinally along the blade; traversing the blade in second lateral direction that is opposite of the first lateral direction.

Traversing the nozzle along the blade includes: traversing the blade in a first longitudinal direction; moving the nozzle laterally along the blade; traversing the blade in second longitudinal direction that is opposite of the first longitudinal direction.

Discharging liquid nitrogen through the nozzle onto a tip coating on the blade to cause shattering of the tip coating from the tip of the blade.

The tip coating is a thermal plasma spray coating.

The nozzle is angled at least between about 45 degrees and about 90 degrees from the blade.

The nozzle is connected to a pump having a pressure between about 10,000 psi and about 60,000 psi.

The nozzle is moved along the blade to lift and peel the coating off of the substrate to reveal strips of the substrate.

The strip of the substrate is revealed by a single pass of the nozzle along the blade.

The strip has a width up to about 2 inches (5.08 centimeters).

The nozzle is moved along the blade such that the strips overlap.

The nozzle is rotating or non-rotating.

The nozzle is a single-orifice nozzle or a multi-orifice nozzle.

The substrate is an aluminum alloy substrate.

The coating is an airfoil coating that comprises 3 layers.

The first layer is a bond primer, the second layer is a paint primer, and the third layer is a urethane top layer.

The discharging and traversing steps remove the first layer, the second layer, and the third layer at the same time.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for stripping a coating off of a blade comprising:
   discharging liquid nitrogen through a nozzle onto the blade at a coating, which comprises a first layer on a substrate of the blade, a second layer on the first layer, and a third layer on the second layer, to erode the coating, wherein the nozzle is connected to a cryogenic pump having a pressure between about 10,000 psi and about 60,000 psi; and
   traversing the nozzle along the blade at a speed between about 1 mm/s and 50 mm/s to cause peeling of the coating off of the substrate of the blade by eroding the first layer off the substrate, eroding or fracturing the second layer at the same time as the first layer, and exfoliating the third layer as the nozzle traverses the blade, wherein the liquid nitrogen goes between the coating and the substrate to cause lifting of the coating from the substrate, such that the first layer, the second layer, and the third layer of the coating are removed at the same time;
   wherein the nozzle is moved along the blade to lift and peel the coating off of the substrate to fully reveal strips of the substrate that extend from a first end of the blade to a second end of the blade opposite the first end, each of the strips of the substrate being revealed by a single pass of the nozzle along the blade, and each of the strips of the substrate having a width up to about 2 inches (5.08 centimeters).

2. The method of claim 1, wherein the blade is a fan blade.

3. The method of claim 1, wherein peeling the coating off of the substrate of the blade includes peeling the coating off of the substrate of the blade without eroding the substrate of the blade.

4. The method of claim 1, further including positioning the nozzle to have a stand-off distance from the blade of at least between about 0.050 inch (0.127 centimeter) and 2.0 inches (5.08 centimeters).

5. The method of claim 1, wherein traversing the nozzle along the blade includes:
   traversing the blade in a first lateral direction;
   moving the nozzle longitudinally along the blade;
   traversing the blade in second lateral direction that is opposite of the first lateral direction.

6. The method of claim 1, wherein traversing the nozzle along the blade includes:
   traversing the blade in a first longitudinal direction;
   moving the nozzle laterally along the blade;
   traversing the blade in second longitudinal direction that is opposite of the first longitudinal direction.

7. The method of claim 1, further including discharging liquid nitrogen through the nozzle onto a tip coating on the blade to cause shattering of the tip coating from the tip of the blade.

8. The method of claim 7, wherein the tip coating is a thermal plasma spray coating.

9. The method of claim 1, wherein the nozzle is angled at least between about 45 degrees and about 90 degrees from the blade.

10. The method of claim 1, wherein the nozzle is moved along the blade such that the strips of the substrate overlap.

11. The method of claim 1, wherein the nozzle is rotating.

12. The method of claim 1, wherein the nozzle is a single-orifice nozzle.

13. The method of claim 1, wherein the substrate is an aluminum alloy substrate.

14. The method of claim 1, wherein the first layer is a bond primer, the second layer is a paint primer, and the third layer is a urethane top layer.

15. The method of claim 1, wherein the nozzle is non-rotating.

16. The method of claim 1, wherein the nozzle is a multi-orifice nozzle.

\* \* \* \* \*